United States Patent [19]

Shimanuki

[11] Patent Number: 5,050,206
[45] Date of Patent: Sep. 17, 1991

[54] TELEPHONE SYSTEM RESPONSIVE TO A COMMAND INCOMING DURING MESSAGE REPRODUCTION

[75] Inventor: Masanobu Shimanuki, Yokohama, Japan

[73] Assignee: Kabushiki Kaisha Toshiba, Kanagawa, Japan

[21] Appl. No.: 459,354

[22] Filed: Dec. 29, 1989

[30] Foreign Application Priority Data

Jan. 5, 1989 [JP] Japan .................... 64-623

[51] Int. Cl.$^5$ .............................. H04M 1/65
[52] U.S. Cl. ......................... 379/67; 379/88; 379/77; 379/80
[58] Field of Search ............. 379/88, 89, 67, 77, 379/80

[56] References Cited

U.S. PATENT DOCUMENTS 4,873,714 10/1989 Ishii et al. .................. 379/88
4,949,374 8/1990 Ishii et al. .................. 379/88

Primary Examiner—Thomas W. Brown
Attorney, Agent, or Firm—Finnegan, Henderson, Farabow, Garrett, and Dunner

[57] ABSTRACT

There is provided a telephone system including a recording/reproducing section for recording an answering message to be transmitted to a calling subscriber and for reproducing the answering message, wherein a predetermined command from the calling subscriber is received through a telephone line during sending of the reproduced answering message to the telephone line, a predetermined operation is executed in correspondence with the command. In this telephone system, there are provided sections (25, 107) for generating a soundless period discrimination signal indicating a soundless period of the answering message at the time of recording the answering message, and command reception sections (11, 20, 21) for receiving the command signal in response to the soundless period discrimination signal at the time of sending the reproduced answering message to the telephone line.

7 Claims, 3 Drawing Sheets

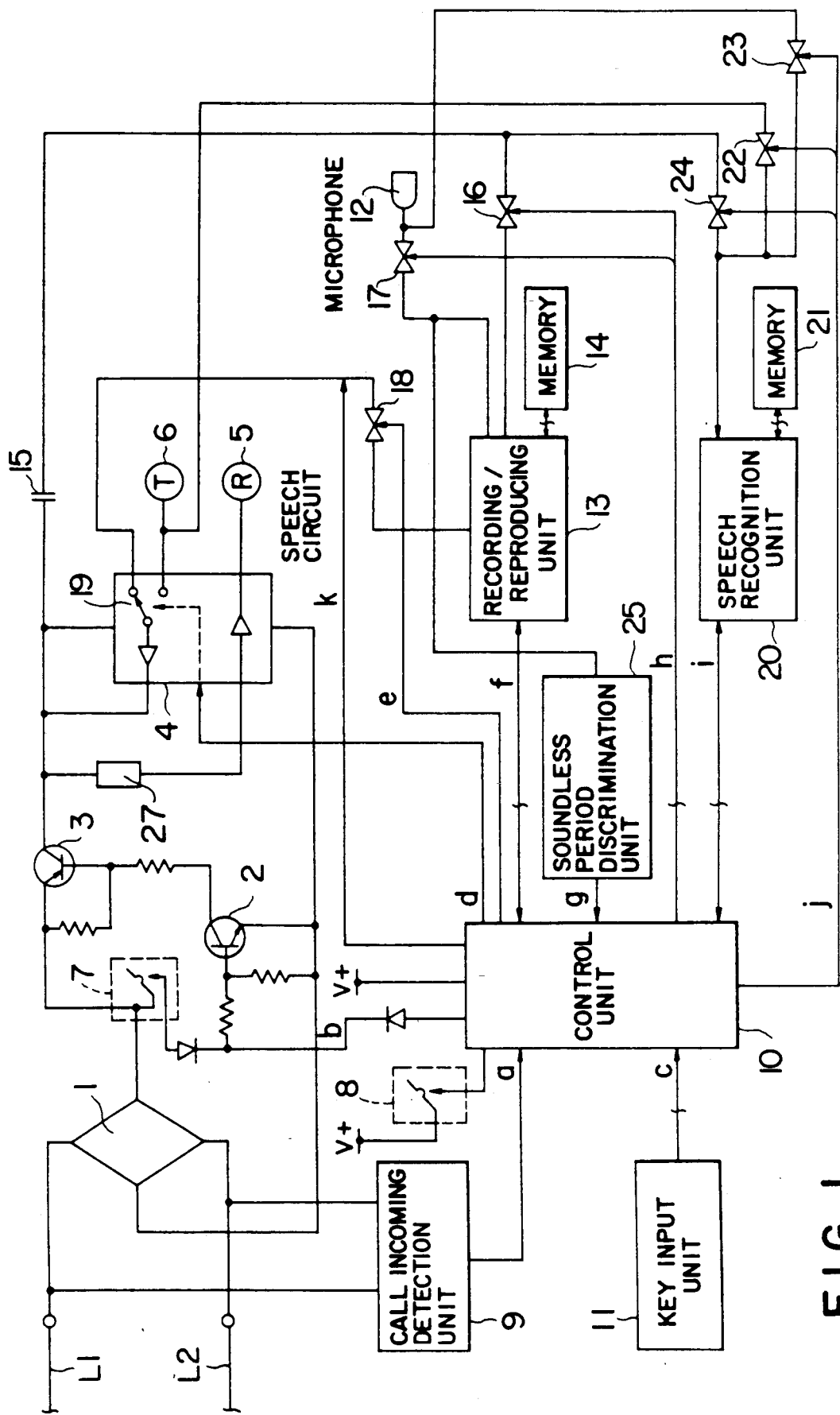
F I G. 1

TELEPHONE SYSTEM RESPONSIVE TO A COMMAND INCOMING DURING MESSAGE REPRODUCTION

BACKGROUND OF THE INVENTION

This invention relates to a telephone system provided with a remote control mechanism.

Hitherto, there have been telephone systems provided with a remote control mechanism capable of carrying out a remote control through a telephone circuit.

Conventional telephone systems of this kind include means for detecting a call signal from a telephone circuit to automatically respond to the incoming call, and a PB receiver for receiving and discriminating a push-button dial (hereinafter abbreviated as a PB) signal from the telephone circuit, and means for judging a command indicated by the PB signal on the basis of a signal indicative of the discriminated result of the PB signal.

In the case of carrying out a remote control of a telephone set provided in such a telephone system, calling is first made through the telephone circuit. Thus, the telephone set automatically responds to this to send an answering message. Upon confirming this answering message, a user operates the key input section to send a command based on a predetermined PB signal. Thus, the PB signal is received and discriminated by the PB receiver. Then, the command indicated by the PB discriminated signal is judged by the judgment means. Depending upon judged results, various controls will be performed.

Thus, interruption of reproduction of the answering message, reproduction of messages from other persons, operation of the room monitor, and the like can be made by a remote control through the telephone circuit.

Meanwhile, a user of the telephone ordinarily wishes to efficiently finish his business, and to make the speech time as short as possible. From such a point of view, an approach could be employed to conduct a remote control after reproduction of the answering message is completed. In this connection, since hearing of the answering message is useless in the case of the remote control, the abovementioned conventional system is constructed so that the remote control can be initiated during reproduction of the answering message.

However, since the PB receiver is also brought into a PB signal standby state, while still being connected to the telephone circuit, the answering message is also transmitted to the PB receiver. For this reason, it is likely that the answering message serves as a noise for the PB receiver, which may then fail to acknowledge receipt of a PB signal even when a calling subscriber sent it. To avoid this, an effort must be made to input a command at the time of a break in the speech of the answering message in order to first stop reproduction of the response message such that a soundless state results where no other sound is present and, to thereafter input a desired command. With this method, however, the operation for inputting a command by the PB signal is troublesome, or there are instances where it is difficult to put this method into practice due to the form of the answering message signal.

As stated above, the remote control mechanism in conventional telephone systems is troublesome in operation.

SUMMARY OF THE INVENTION

An object of this invention is to provide a telephone system constructed so that a calling subscriber can carry out a remote control without having to perform complicated operations.

More specifically, this object is to provide a telephone system permitting input of voice commands and making it easy to take an input timing.

This invention provides a telephone system including recording/reproducing means for recording an answering message to be transmitted to a calling subscriber and for reproducing the answering message, wherein a predetermined command from the calling subscriber is received through a telephone line during sending of the reproduced answering message to the telephone line, a predetermined operation is executed in correspondence with the command,, the telephone system comprising means for generating a soundless period discrimination signal indicating a soundless period of the answering message at the time of recording the answering message, and command reception means for receiving the command signal in response to the soundless period discrimination signal at the time of sending the reproduced answering message to the telephone line.

In this system, it is preferable that, when an answering message is reproduced and is being sent to the telephone circuit, the reproduction in the soundless periods of the message is interrupted for a predetermined time period. Thus, reception of the command becomes possible during interruption of the reproduction. Namely, since a predetermined time period is given as a soundless period for inputting the command, inputting of the command becomes easy.

The system of this invention can include speech recognition means so as to permit a speech signal to be used as a command. The speech recognition means receives a speech signal as a command (hereinafter called a voice command) from the telephone circuit during interruption of reproduction, thus to recognize what operation is required.

It is desirable to send, to the telephone circuit, a sound message, e.g., a beep tone for notifying or informing a calling subscriber of a receive enable state of the command at the time of interruption of reproduction of the message. By such a notifying sound, it becomes easy for the calling subscriber to grasp a suitable input timing of the command.

BRIEF DESCRIPTION OF THE DRAWINGS

In the accompanying drawings:

FIG. 1 is a circuit diagram showing an embodiment of a telephone system according to this invention.

DESCRIPTION OF THE PREFERRED EMBODIMENT

Figure 2:
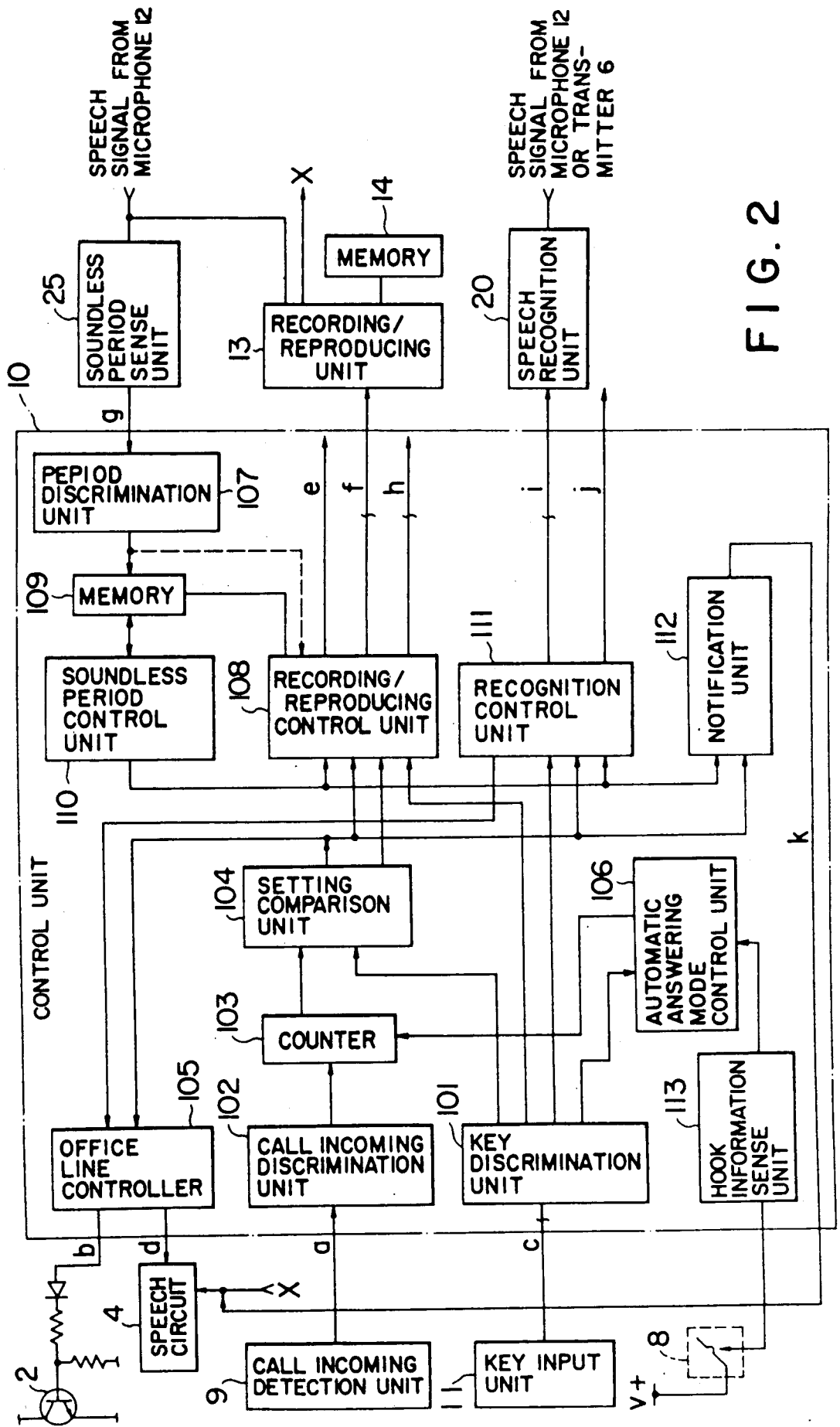
FIG. 2 is a block diagram showing a remote control mechanism of the embodiment shown in FIG. 1.

A preferred embodiment of this invention will now be described with reference to the attached drawings.

Referring to FIG. 1, there is shown an embodiment of a telephone system according to this invention. The telephone system comprises telephone or office lines L1 and L2, a diode bridge 1, transistors 2 and 3 constituting the speech switch, a speech circuit 4, a telephone receiver 5, and a telephone transmitter 6. A speech signal from the office lines L1 and L2 passes through the transistor 3 and an anti-side-tone circuit 27, and is input to the speech circuit 4. The speech signal thus input is delivered from the speech circuit 4 to the telephone receiver 5 and is monitored by the telephone receiver 5. On the other hand, a speech signal from the telephone transmitter 6 is input to the speech circuit 4. The speech signal thus input is then sent from the speech circuit 4 through the transistor 3 and the diode bridge 1 to the office lines L1 and L2.

The telephone system further includes hook switches 7 and 8 cooperating with each other. When the hook switch 7 is turned on the base of the transistor 2 goes high. As a result, the transistor 2 is turned on. Thus, the transistor 3 is turned on, with the result that acquisition of the circuits L1 and L2 is established. The hook switch 8 is connected to a control unit 10. Under the condition where the automatic answering mode is set, the control unit 10 releases the automatic answering mode when the hook switch 8 is turned on, thereafter sets again the automatic answering mode when the hook switch 8 is turned off.

The telephone system further includes a call incoming detection unit 9. The call incoming detection unit 9 detects a call signal from the circuits L1 and L2 to output a call incoming detection signal (signal line a) consisting of an a.c. component thereof. When the control unit 10 is in an automatic answering mode, it outputs a line acquisition command signal (signal line b) when it receives the call incoming detection signal a. The base of the transistor 2 goes high by this line acquisition command signal as well. As a result, the transistor 2 is turned on, and thus the transistor 3 is turned on. Thus, acquisition of these lines L1 and L2 is established.

The telephone system further includes a key input unit 11. This key input unit 11 is composed of dial key pads, automatic answering setting keys for the automatic answering mode, and the like. A signal line for a key input signal to the control unit 10 is designated by c.

In addition, the telephone system further includes a microphone 12, a speech recording/reproducing unit 13, and a memory 14 for sound recording.

The microphone 12 is used for prerecording an answering message (hereinafter abbreviated as an OGM (outgoing message)) and setting comparative data for voice command recognition which will be described below.

The recording/reproducing unit 13 is operative to receive a speech signal from the lines L1 and L2 through the diode bridge 1, the transistor 3, the coupling capacitor 15, and the analog gate switch 16, and to receive a speech signal from the microphone 12 through the analog gate switch 17, thus to write these speech signals as digital data into the memory 14 to record them. Further, the recording/reproducing unit 13 is operative to read out data from the memory 14 to output it as an analog speech signal. This speech signal is sent to the lines L1 and L2 through the analog gate switch 18, the speech circuit 4, the transistor 3, and the diode bridge 1. In this embodiment, the control unit 10 controls the above-mentioned switches 16 to 18 by an on/off control signal (signal line h) of the switches 16 and 17 and an on/off control signal (signal line e).

The speech circuit 4 includes a transmit signal changeover switch 19. This changeover switch 19 switches the speech signal sent to the lines L1 and L2 between the speech signal from the telephone transmitter 6 or the microphone 12 and the speech signal from the recording/reproducing unit 13. The control unit 10 outputs a changeover control signal (signal line d) for the changeover switch 19.

The telephone system further includes a speech recognition unit 20 and a memory 21 for storing comparative data for speech recognition. The speech recognition unit 20 is operative to receive a speech signal from the telephone transmitter 6 through the analog gate switch 22, and to receive a speech signal through the analog gate switch 23, thus to convert a signal from any one of these signals to digital data indicative of the feature thereof such as a frequency to record it into the memory 21 in correspondence with a predetermined command. Further, the speech recognition unit 10 is operative to receive a speech signal from the lines L1 or L2 through the analog gate switch 24 to convert the received speech signal to digital data in the same manner as stated above to make a comparison between that data and the data in the memory 21, thus to discriminate the command indicated by a voice signal. This operation is based on the recognition control signal (signal line i from the control unit 10. In this embodiment, these switches 22, 23 and 24 are controlled by an on/off control signal (signal line j) from the control unit 10.

The telephone system further includes a soundless period sense unit 25. This soundless period sense unit 25 is operative to receive a speech signal from the microphone 12 at the time of recording an OGM to sense the soundless portions in the speech signal, thus to output a soundless period sense signal (signal line g). The control unit 10 receives this soundless period sense signal to sense the soundless period (soundless portion having a length more than a reference value) in the OGM on the basis of the soundless period sense signal to store the position in the OGM of the soundless period. At the time of reproducing the OGM, the control unit 10 generates a recording/reproducing control signal (signal line f) to carry out a reproductive control so that reproduction is interrupted or broken only for a suitable time period for each soundless period, to generate a recognition timing control signal (signal line i) for each soundless period to carry out a control of speech recognition timing of the speech recognition unit 20, and to generate a signal (signal line k) for notifying or informing a calling subscriber of the input timing of the speech command.

The details of the control unit 10 for carrying out an automatic answering control will now be described.

In FIG. 2, reference numeral 101 denotes a key discrimination unit. This key discrimination unit 101 discriminates a key input signal from the key input unit 11 to generate various signals in accordance with discriminated results. For such signals, there is an automatic answering switch signal, a comparative data signal, a recording/reproducing instruction signal, and a registration instruction signal, etc. It is to be noted that the key discrimination unit 101 has the ability to discriminate the dial operation. Thus, in the case of the transmission by a dial pulse (hereinafter abbreviated as a DP), an approach is employed to input numerical data to the DP generation unit to allow the DP generation unit to generate therefrom a DP signal corresponding to the numerical data, thus delivering it to a dial drive unit outside the control unit 10. Further, in the case of transmission by PB signal, an approach is employed to deliver the numerical data to the PB signal generation unit to allow the PB signal generation unit to generate therefrom a PB signal corresponding to the numerical data, thus to deliver it to the telephone transmit system of the speech circuit 4. An indication of such a transmitter unit is omitted because it does not constitute the essential part of this invention.

The telephone system includes a call incoming discrimination unit 102, a counter 103, a setting comparison unit 104, and an office line controller 105. The call incoming discrimination unit 102 discriminates between the presence and absence of a call incoming detection signal input from the call incoming sense unit 9, and outputs one pulse everytime the call signal is received. The counter 103 counts those pulses and delivers the count value to the setting comparison unit 104. In the setting comparison unit 104, a numeric value such as "3" is preset by key input unit 11 via key discrimination unit 101. The setting comparison unit 104 compares the count value with the numeric value, and outputs an answering command signal when both the values are in correspondence with each other. The line controller 105 responds to the answering command signal to output the line acquisition signal.

Reference numeral 106 denotes an automatic answering mode control unit. The automatic answering switch signal from the key discrimination unit 101 and hook information sense signal from the hook information sense unit 113 are input to the automatic answering mode control unit 106. When the automatic answering mode control unit 106 receives an automatic answering switch signal under the condition where the hook information sense signal does not indicate the off-hook state, this unit 113 is brought into the automatic answering control state, and outputs an automatic answering mode signal. Further, when the automatic answering mode control unit 106 receives again an automatic answering switch signal during the automatic answering control state, or the hook information sense, signal indicates the off-hook state, this unit 106 releases the automatic answering control state to stop output of the automatic answering mode signal. In addition, after releasing the automatic answering state in response to the hook information sense signal indicating the off-hook state, when the hook information sense signal returns to the on-hook state, the automatic answering mode control unit 106 sets the automatic answering state again. This automatic answering mode signal is delivered to the counter 103. Thus, the counter 103 carries out the count operation only when it receives the automatic answering mode signal. Thus, when the automatic answering mode is not set, the automatic answering operation is not performed.

The telephone system further includes a period discrimination unit 107, a recording/reproducing control unit 108, a memory 109, and a soundless period control unit 110.

The period discrimination unit 107 receives a sense signal from the soundless period sense unit 25 to discriminate between times of soundless periods and sound periods depending upon whether or not the time length of this signal is longer than a predetermined value to output a period discrimination signal. For example, in the case where a speech signal of the OGM is as shown in FIG. 3(a), the period discrimination signal is such that the sound periods t1, t3 and t5 corresponding to the sentences such as "Hello, this is . . . ,", "I am absent at present", ". . .", etc. and the soundless periods t2, t4 and t6 corresponding to the pauses or periods of these sentences are indicated by low and high voltage levels, as shown in FIG. 3(b), respectively.

When the recording/reproducing control unit 108 receives a recording or reproducing command signal from the key discrimination unit 101, it controls the speech recording/reproducing unit 13 so as to perform a recording/reproducing operation in accordance with the command signal. Further, when the recording/reproducing control unit 108 receives an OGM recording command signal from the key discrimination unit 101, it allows the speech recording/reproducing unit 13 to carry out a recording operation of the OGM, and, at the same time, drives the memory 109 in a write mode to write the period discrimination signal from the period discrimination unit 107 into the memory 109. In addition, when the recording/reproducing control unit 108 receives an automatic answering command signal from the setting comparison unit 104, it allows the speech recording/reproducing unit 13 to reproduce the OGM, and, at the same time, drives the memory 109 in a read mode to output the period discrimination signal to the soundless period control unit 110. The soundless period control unit 110 senses the starting point of the soundless period in response to the up edge from low to high level of the period discrimination signal to output a soundless period control signal as shown in FIG. 3(c) which goes high at fixed soundless control periods T1, T2 and T3 from the starting point.

The recording/reproducing control unit 108 receives this soundless period control signal as a reproduction command signal and a pause command signal. Namely, when the soundless period control signal is at low level, the recording/reproducing control unit 108 receives it as a reproduction signal to carry out readout of the period discrimination signal for a time period during which it is receiving the reproduction signal. On the other hand, when the soundless period control signal is at high level, the recording/reproducing control means 108 receives it as a pause signal to pause or interrupt readout of the period discrimination signal and reproduction of OGM for a time period during which it is receiving the pause signal. Thus, the recording signal shown in FIG. 3(a) appears as a reproduced signal having soundless periods T1, T2 and T3 added thereto as shown in FIG. 3(d).

There is further included a recognition control unit 111 in the telephone system. The recognition control unit 111 recognizes soundless control periods T1, T2 and T3 by the soundless period control signal from the soundless period control unit 110 to output, to the speech recognition unit 20, a recognition period indication signal (signal line i) as shown in FIG. 3(f), thereby to control the speech recognition unit 20 so as to perform the speech recognition operation at the soundless control periods T'1, T'2 and T'3. Further, when the recognition control unit 111 receives the recognition data signal (signal line i) from the speech recognition unit 20, it informs a notification unit 112 of the end of the speech recognition and decodes the recognition data, thus to send control commands to the respective units. The actual content thereof will be described in detail in conjunction with the explanation of the operation.

An automatic answering command signal from the setting comparison unit 104, a soundless period control signal from the soundless period control unit 110, and a recognition end notifying signal from the recognition control unit 111 are input to the notification unit 112. This notification unit 112 responds to an automatic answering command signal to produce a beep tone signal (signal line k) which is maintained at high level for a fixed time period when the soundless control signal rises and when it has received the recognition completion notifying signal. A pulse of high level of the beep tone signal serves as, in dependency upon of occurrence of times, a business input timing notifying signal, a soundless period start notifying signal (i.e., a speech command input timing notifying signal shown in FIG. 3(e)), or a speech recognition completion notifying signal. A calling subscriber can recognize the input timing of business by the business input timing notifying signal, recognize the input timing of the speech command by the speech command input timing notifying signal, and recognize by the recognition completion signal that the speech recognition of a command inputted by the calling subscriber himself has been made.

The operation of the remote control mechanism in the telephone system according to this embodiment constructed above will now be described.

[1] Operation for registering comparative speech data used for recognition of voice command.

Initially, a user depresses a registration instruction key of the key input unit 11. The recognition control unit 111 is informed or notified from the key input unit 11 that the registration instruction key has been depressed. Thus, the recognition unit control unit 111 is brought into a state waiting for a designated input of command. At this time, the user operates the key input unit 11 to designate a command. Such a designation is carried out, e.g., by numerals. To ·· 'ize this, a Table allowing various commands to resp ..vely correspond to different numerals is provided within the recognition control unit 111. Responding to the depression of a numeric key in the key input unit 11, the recognition control unit 111 turns switches 22 and 23 on to allow a speech signal from the transmitter 6 and the microphone 12 to be input to the speech recognition unit 20, and allows the speech recognition unit 20 to recognize an input speech signal to make an instruction to record the voice recognized result in correspondence with a numeral of the depressed key. At this stage, when user inputs a speech through the telephone transmitter 6 or the microphone 12, this is recognized by the speech recognition unit 20. As a result, the feature such as frequency or pattern, etc. is extracted. The data extracted is registered into the memory 21 as comparative speech data.

By allowing the telephone system to have such functions, the user can employ language easy to use as a command for effecting a remote control.

[2] Operation for recording OGM

Initially, a user operates the OGM recording key of the key input unit 11. Thus, the recording/reproducing control unit 108 is informed that this key has been depressed. As a result, the recording/reproducing control unit 108 turns the switch 17 on to activate the recording/reproducing unit 13 to allow the memory 14 to provide a write access thereto. Thus, when the user inputs a voice signal from the microphone 12, the voice signal is recorded into the memory 14. At the same time, the soundless period of the input voice signal is sensed at the soundless period sense unit 25, and a period discrimination signal is output from the period discrimination unit 107. Thus, this signal is written into the memory 109.

When the user has depressed the stop key of the key input unit 11, the recording/reproducing control unit 108 is informed from the key discrimination unit 101 that this stop key has been depressed. As a result, the recording/reproducing control unit 108 turns the switch 17 off to allow the recording/reproducing unit 13 to be inactive and to stop writing into the memory 109. Thus, recording operation of the answering message is completed.

[3] Automatic call incoming answering operation

In the case where a user allows this system to be set in an automatic answering state, he depresses the automatic answering key of the key input unit 11 with the hand set being in an on hook state. Thus, the automatic answering control unit 106 is informed from the key discrimination unit 101 that the automatic answering key has been depressed. At this time, an on-hook state sense signal is input from the hook information sense unit 113 to the automatic answering control unit 106. Accordingly, the automatic answering control unit 106 allows the count unit 103 to be in a count enable state. In addition, the answering start timing determined depending upon what number of times the call signal is repeated is set at the key discrimination unit 101 by the key input unit 11.

Under this state, when a call signal is incoming to this telephone system through the lines L1 and L2, its a.c. component is taken out by the call incoming detection unit 9, and is sensed by the call incoming discrimination unit 102. Thus, pulses are produced from the call incoming discrimination unit 102 in synchronism with repetition of the call signal. Such pulses are counted by the counter 103. When the count value is in correspondence with a set repetition number of times set at the key discrimination unit 101, an answering command signal is output from the setting comparison unit 104. Thus, this answering command signal is input to the line control unit 105, the notification unit 112, the recording/reproducing control unit 108 and the recognition control unit 111.

Thus, the line control unit 105 responds to this answering command signal to generate a line acquisition signal to allow the transistor 2 to be turned on to thereby turn the transistor 3 on to acquire the lines L1 and L2, and to generate a switching control signal to switch the changeover switch 19 to the recording/reproducing 13 side.

At this time, the notification unit 112 produces a beep tone signal. The beep tone signal thus produced is sent to the lines L1 and L2 through the speech circuit 4.

The recording/reproducing control unit 108 turns the switch 18 on, thereafter to allow the memory 109 to initiate a read operation.

Figure 3:
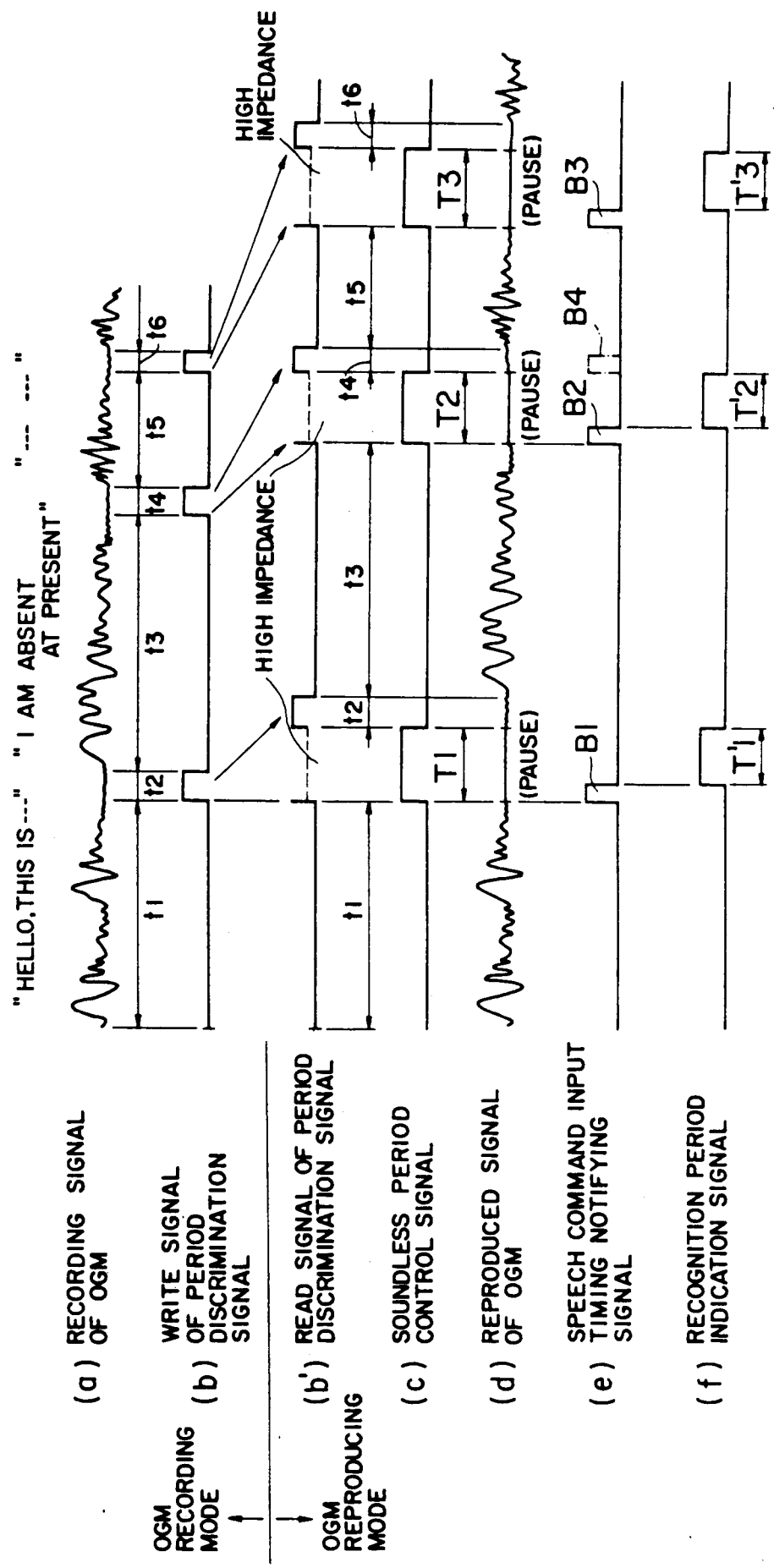
FIG. 3 is a time chart for explaining the operation of the remote control mechanism shown in FIG. 2.

Thus, period discrimination signals recorded in the memory 109 are sequentially read out. Such signals are delivered to the soundless period control unit 110. Thus, the soundless control unit 110 generates a soundless period control signal (FIG. 3(c)) which is maintained at high level only at predetermined time periods T1, T2 and T3 from the rise time of the period discrimination signal (FIG. 3(b')). The recording/reproducing control unit 108 controls the read operation of the memory 109 and the reproducing operation of the recording/reproducing unit 13 in accordance with the soundless period control signal. Namely, when the soundless period control signal is at low level, the control unit 108 receives the low level signal as a reproduction signal, thus allowing the memory 109 to perform a read operation, and allowing the recording/reproducing unit 13 to perform a reproducing operation. In contrast, when the soundless period control signal is at high level (soundless control periods T1, T2 and T3), The unit 108 receives this high level signal as a pause signal to interrupt or pause the read operation of the memory 109 and the reproducing operation of the recording/reproducing unit 13. As a result, the speech signal shown in FIG. 3(a) appears as shown in FIG. 3(d), i.e., is reproduced in a manner that the soundless period is prolonged by the soundless control periods T1, T2 and T3.

The recognition control unit 111 turns the switch 24 on when the soundless period control signal is at high level, and produces a recognition period indication signal as shown in FIG. 3(f) on the basis of the soundless period control signal, thus to control the speech recognition unit 20 so as to recognize a speech signal input when the recognition period indication signal is at high level.

On the other hand, the notification unit 112 generates beep tone signals B1, B2 and B3 for notifying a voice command input timing at the time of rise of the soundless period control signal as shown in FIG. 3(e). These beep tone signals B1, B2 and B3 are sent to the lines L1 and L2 via the speech circuit 4. A calling subscriber hears such beep tones, thereby making it possible to recognize the input timing of the voice command.

Accordingly, after the calling subscriber hears these beep tones, the user orally inputs a voice command during the recognition periods T'1, T'2 and T'3 shown in FIG. 3(f), this voice signal is recognized at the speech recognition unit 20. After the speech recognition is completed, the speech recognition unit 20 sends data indicative of the result of the recognition to the recognition control unit 111.

When the recognition control unit 111 receives this result of the recognition, it transmits a speech recognition completion notifying signal to the notification unit 112, and transmits a command signal for stopping reproduction of an answering message to the recording/reproducing control unit 108.

For example, when completion of the speech recognition is made during the recognition period T'2, the notification unit 112 produces, at the timing shown in FIG. 3(e), a beep tone signal B4 indicating that recognition of the speech command has been completed. The calling subscriber can be assured by that beep tone that the voice command has been recognized.

Further, the recording/reproducing control unit 108 responds to a stop command signal to stop the operation for reproducing the answering message at the recording/reproducing unit 13.

When the speech recognition has been completed, the recognition unit control unit 111 carries out various controls in dependency upon the result of recognition. For example, there are reproduction of recorded messages from previous calling subscribers (hereinafter abbreviated as ICM (incoming messages)), drive of the room monitor, etc.

In the case of reproduction of the ICM, the recognition control unit 111 instructs the recording/reproducing control unit 108 to reproduce the ICM. Thus, the recording/reproducing control unit 108 allows the switch 18 to be turned on, and allows the recording/reproducing unit 13 to reproduce the ICM. As a result, a reproduced speech signal is sent to the lines L1 and L2 through the speech circuit 4. Thus, a calling subscriber can hear the ICM.

In the case of reproduction of room monitor, the recognition control unit 111 allows the switches 22 and 23 to be turned on, and transmits a switching instruction signal to the line control unit 105, thus allowing the line control unit 105 to switch the changeover switch 19 to the telephone transmitter 6 side to which the microphone 12 is connected in parallel. Thus, a speech signal from the microphone 12 is sent to the lines L1 and L2 via the switches 23 and 22, and the speech circuit 4. The calling subscriber hears this speech, thereby making it possible to grasp the circumstance of the room where this telephone set is installed.

The scope of this invention is not limited only to the above-described embodiment, but may be modified in various manners within the scope which is not departing from the gist of this invention. For example, an approach may be employed such that for a time period during which a certain operation (e.g., reproduction of ICM) is executed by a voice command initially inputted, the initial operation is stopped by inputting the next voice command to initiate a different operation (e.g., drive of a room monitor) In such a modified example, it is desirable for facilitating inputting of the next voice command particularly during reproduction of the ICM to carry out, also at the time of recording and reproducing of the ICM, a processing similar to the processing for elongation of soundless period carried out at the time of recording and reproducing of the OGM in the above-described embodiment.

In the above-described embodiment, soundless periods t1, t2 and t3 at the time of recording of the OGM exist in the reproduced signal of the OGM (FIG. 3(d)), but such soundless periods may be eliminated from a reproduced signal. To realize, this, it is preferable to deliver a period discrimination signal to the recording/reproducing control unit 108 as indicated by broken lines in FIG. 2 to control the recording/reproducing unit 13 so as to interrupt or pause the recording operation for a time period during which the period discrimination signal from the recording/reproducing unit 108 represents a soundless period (high level). Thus, soundless periods t1, t2 and t3 are eliminated from the recorded speech signal. By reproducing the recorded signal in the same manner as in the above-described embodiment, the soundless period of the reproduced signal includes only soundless control periods T1, T2 and T3, and the length thereof is not influenced by the length of the soundless periods t1, t2 and t3 at the time of recording. On the other hand, in the case of allowing the soundless periods t2, t4 and t6 to be left as in the above-embodiment, the head portion of the sound periods t3 and t5 is cut, thus making it possible to prevent a reproduced sound from unnaturally rising.

What is claimed is:

1. A telephone system comprising:
    recording/reproducing means for recording an answering message to be transmitted to a calling subscriber and for reproducing the answering message, wherein a predetermined command from the calling subscriber is received through a telephone line during transmittal of the reproduced answering message to said telephone line, and a corresponding predetermined operation is executed in response to the receipt of said predetermined command control means for controlling the recording/reproducing means so as to prolong a soundless period of the answering message when the answering message is reproduced, and for generating a recognition period indication signal during the prolonged soundless period of the reproduced answering message; and command reception means for receiving said predetermined command when enabled by said recognition period indication signal during the sending of the reproduced answering message to said telephone line.

2. The telephone system as set forth in claim 1, further comprising:

generating means for generating a soundless period discrimination signal indicating the soundless period of the answering message when the answering message is recorded; and memory means for storing the generated soundless period discrimination signal which is written thereinto at the time of recording the answering message and read therefrom when the answering message is reproduced;

wherein said control means controls said recording/reproducing means so as to prolong the soundless period of the reproduced answering message in response to the soundless period discrimination signal read from said memory means.

3. The telephone system as set forth in claim 1, wherein said command reception means comprises:

a memory for storing speech data indicating the predetermined characteristics of a speech signal which corresponds with said predetermined command, in a manner in which said speech data and said command data have a corresponding relationship; and means for receiving a voice command from the calling subscriber through said telephone line to obtain data indicating its characteristics, and for comparing the characteristics of the data of the voice command with the speech data in said memory to thereby recognize the corresponding predetermined operation to be executed, thus permitting the telephone system to be subjected to remote control by the voice command.

4. The telephone system as set forth in claim 1, further comprising:

means for sending, to said telephone line, a notifying tone signal for urging the calling subscriber to transmit the command during the prolonged soundless period of the reproduced answering message.

5. The telephone system as set forth in claim 2, wherein said control means temporarily stops reproduction of the answering message for a predetermined time period in response to the soundless period discrimination signal read from said memory means, so that the soundless period of the reproduced answering message is prolonged.

6. The telephone system as set forth in claim 5, wherein said control means temporarily stops recording of the answering message during the soundless period of the answering message in response to the soundless period discrimination signal generated when the answering message is recorded.

7. A telephone system comprising:

recording/reproducing means for recording an incoming message received from a telephone line and for reproducing the incoming message, wherein a predetermined command from a calling subscriber is received through said telephone line during sending of the reproduced incoming message to said telephone line, and a predetermined operation is executed in correspondence with the command;

control means for controlling said recording/reproducing means so as to prolong a soundless period of the incoming message when the incoming message is reproduced, and for generating a recognition period indication signal during the prolonged soundless period of the reproduced incoming message; and command reception means for receiving said predetermined command when enabled by said recognition period indication signal during the sending of the reproduced incoming message to the telephone line.

* * * * *